US 11,273,858 B2

(12) United States Patent
Kato

(10) Patent No.: US 11,273,858 B2
(45) Date of Patent: Mar. 15, 2022

(54) POWER TRANSMISSION SYSTEM

(71) Applicant: TOSHIBA TEC KABUSHIKI KAISHA, Tokyo (JP)

(72) Inventor: Masakazu Kato, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 309 days.

(21) Appl. No.: 16/507,073

(22) Filed: Jul. 10, 2019

(65) Prior Publication Data

US 2020/0122762 A1 Apr. 23, 2020

(30) Foreign Application Priority Data

Oct. 22, 2018 (JP) .............................. JP2018-198610
Mar. 13, 2019 (JP) .............................. JP2019-046299

(51) Int. Cl.
*B62B 3/14* (2006.01)
*H02J 50/10* (2016.01)
*H02J 7/02* (2016.01)

(52) U.S. Cl.
CPC .......... *B62B 3/1404* (2013.01); *B62B 3/1416* (2013.01); *B62B 3/1424* (2013.01); *H02J 7/025* (2013.01); *H02J 50/10* (2016.02)

(58) Field of Classification Search
CPC ... B62B 3/1404; B62B 3/1416; B62B 3/1424; H02J 50/10; H02J 7/025; H02J 50/40; A47F 10/04
See application file for complete search history.

(56) References Cited

U.S. PATENT DOCUMENTS

2008/0231228 A1* 9/2008 Fowler ................. B62B 3/1424
320/107
2019/0207427 A1* 7/2019 McNeally ................ B62B 3/14

FOREIGN PATENT DOCUMENTS

| EP | 2273444 | 1/2011 |
| JP | 2006-101577 | 4/2006 |
| JP | 2006101577 | * 4/2006 |

OTHER PUBLICATIONS

Extended European Search Report for European Patent Application No. 19192283.0 dated Apr. 9, 2020.

* cited by examiner

*Primary Examiner* — Nha T Nguyen
(74) *Attorney, Agent, or Firm* — Amin, Turocy & Watson, LLP

(57) ABSTRACT

According to an embodiment, a power transmission system includes a power transmission antenna, a first rail and a second rail. The power transmission antenna is disposed facing the power reception antenna installed on the side surface of the cart stored in the storage position. The first rail includes a first groove that guides, among a plurality of wheels for moving the cart to the storage position, a first wheel that is closest to the power transmission antenna while the cart is stored in the storage position, and that causes a distance between the power reception antenna and the power transmission antenna installed on the side surface of the cart to be within a power transmittable range. The second rail includes a second groove that guides, among the plurality of wheels for moving the cart, a second wheel that is different from the first wheel to the storage position.

18 Claims, 11 Drawing Sheets

FIG. 13

| GROOVE WIDTH (mm) | INCREASE RATE WITH RESPECT TO WHEEL WIDTH (%) | WHEEL ANGLE (DEGREE) | EASE OF PULLING OUT | REMARKS |
|---|---|---|---|---|
| 30 | 11.1 | LESS THAN 3 | ◎ | SMOOTH PULLING OUT POSSIBLE |
| 35 | 29.6 | 7 | ○ | SMOOTH PULLING OUT POSSIBLE |
| 40 | 48.1 | 11 | △ | LARGE RESISTANCE |
| 45 | 66.7 | 16 | × | SMOOTH PULLING OUT IMPOSSIBLE |
| 50 | 85.1 | 20 | × | RIDE ON RAIL POSSIBLE |

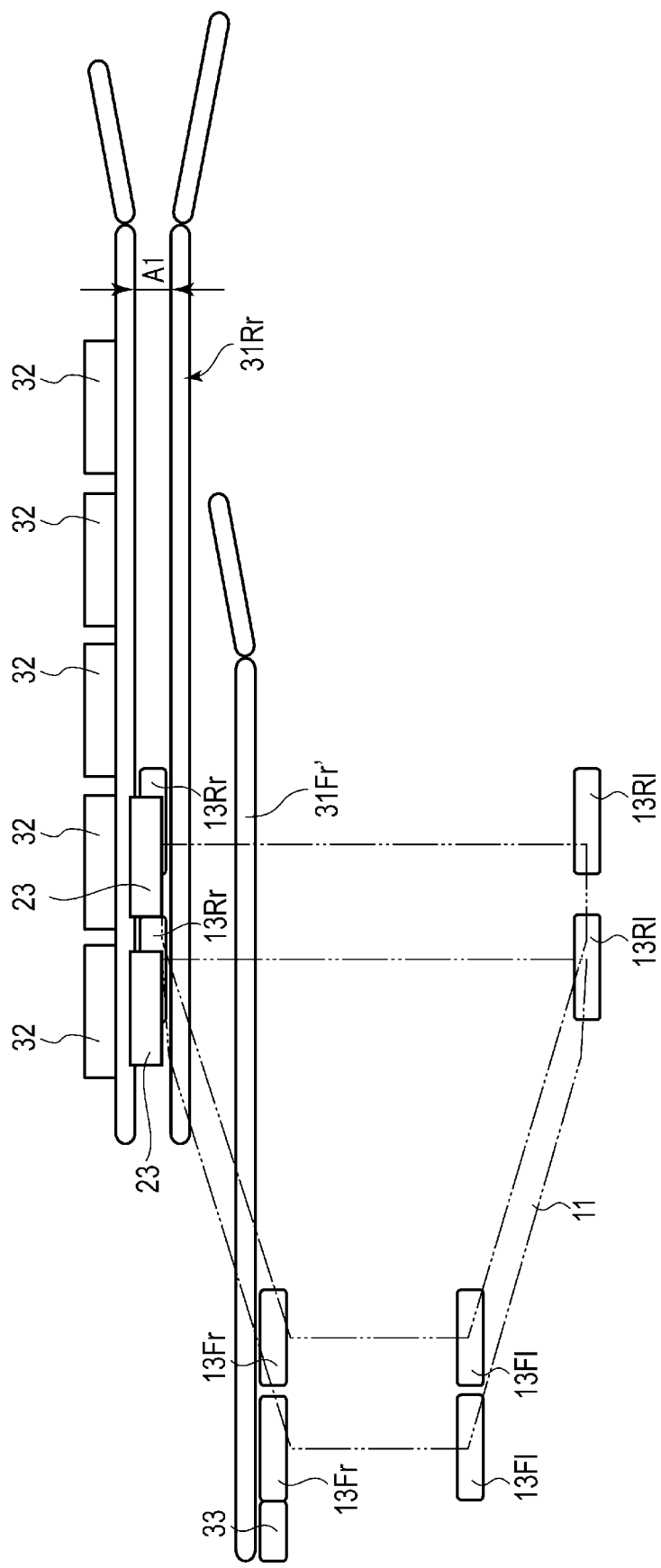

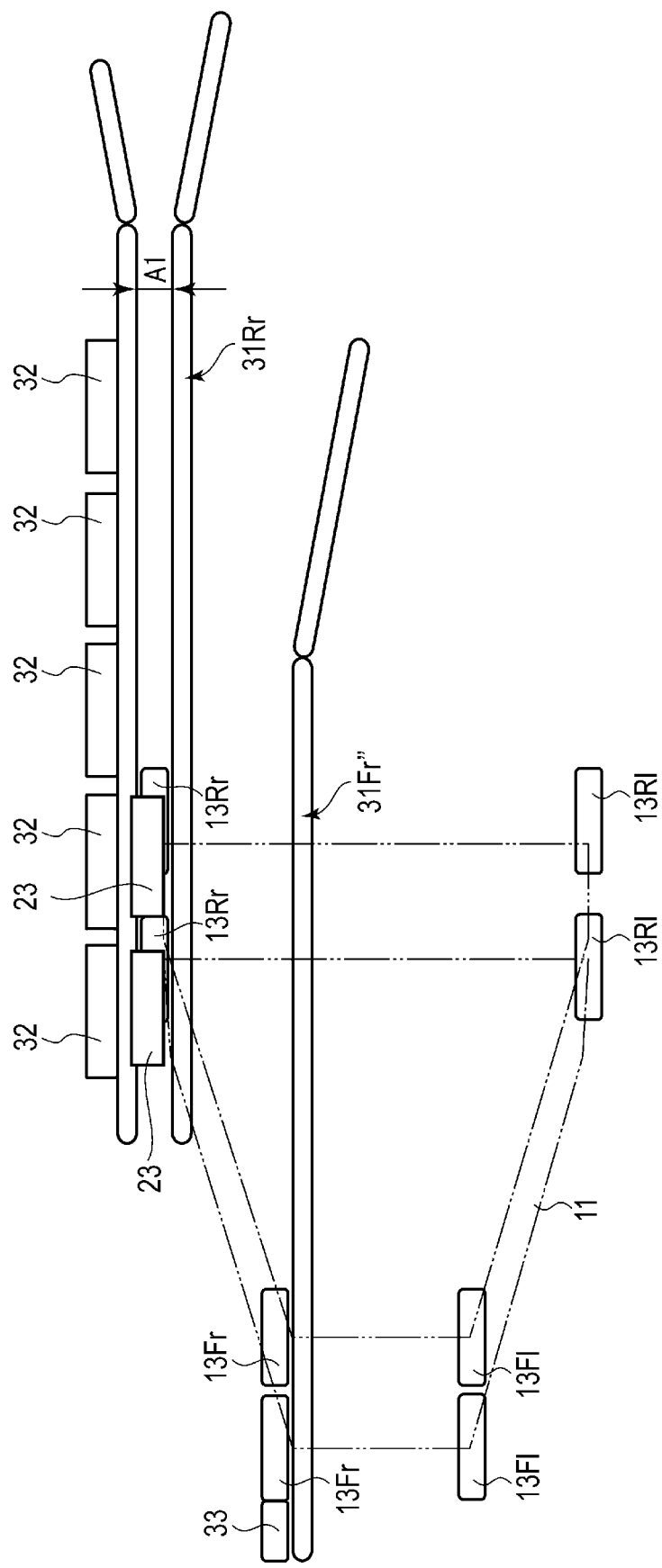

POWER TRANSMISSION SYSTEM

CROSS-REFERENCE TO RELATED APPLICATIONS

This application is based upon and claims the benefit of priority from Japanese Patent Application No. 2018-198610, filed on Oct. 22, 2018 and Japanese Patent Application No. 2019-046299, filed on Mar. 13, 2019; the entire contents of both of which are incorporated herein by reference.

FIELD

Embodiments described herein relate generally to a power transmission system, a power transmission device, and a power transmission method.

BACKGROUND

In recent years, a power transmission system is provided, which charges a battery using a technology that transmits power contactlessly. In contactless power transmission, an alignment of antennas such as coils between the power reception side and the power transmission side is important for efficient power transmission. For example, in a system for transmitting power contactlessly to a power reception coil provided in a moving object, it is necessary to move the moving object reliably in accordance with the installation position of the power transmission coil.

As a power transmission system using contactless power transmission, a system that supplies power to a battery or an electronic device mounted on a shopping cart operated by a user is devised. In order to operate such a power transmission system, it is necessary to reliably move a receiving device and the shopping cart equipped with the device to a predetermined stop position where a power transmission antenna is installed. In addition, a shopping cart used by a general user needs to be easily movable to a predetermined stop position and easily movable from the predetermined stop position. However, there is a problem that it is not easy to stop the shopping cart at the stop position or move it from the stop position with a level of accuracy that enables contactless power transmission.

DESCRIPTION OF THE DRAWINGS

FIG. 13 is a view showing an experimental result of subjective evaluation regarding an easiness of a movement of a cart with respect to a width of a groove of guide rails in the power transmission system;

FIG. 14 is a view showing a first exemplary configuration as a modification of the guide apparatus; and FIG. 15 is a view showing a second exemplary configuration as a modification of the guide apparatus.

DETAILED DESCRIPTION

Embodiments provide a power transmission system capable of reliably guiding a moving object to a power transmittable range.

In general, according to an embodiment, the power transmission system includes a power transmission antenna, a first rail, and a second rail. The power transmission antenna is disposed to face a power reception antenna installed on a side surface of a cart stored in a storage position. The first rail includes a first groove that guides, among a plurality of wheels for moving the cart to the storage position, a first wheel that is closest to the power transmission antenna while the cart is stored in the storage position, and that causes a distance between the power reception antenna and the power transmission antenna installed on the side surface of the cart to be within a power transmittable range. The second rail includes a second groove that guides, among the plurality of wheels for moving the cart, a second wheel that is different from the first wheel to the storage position.

Hereinafter, a power transmission system according to each embodiment will be described with reference to the drawings.

Figure 1:
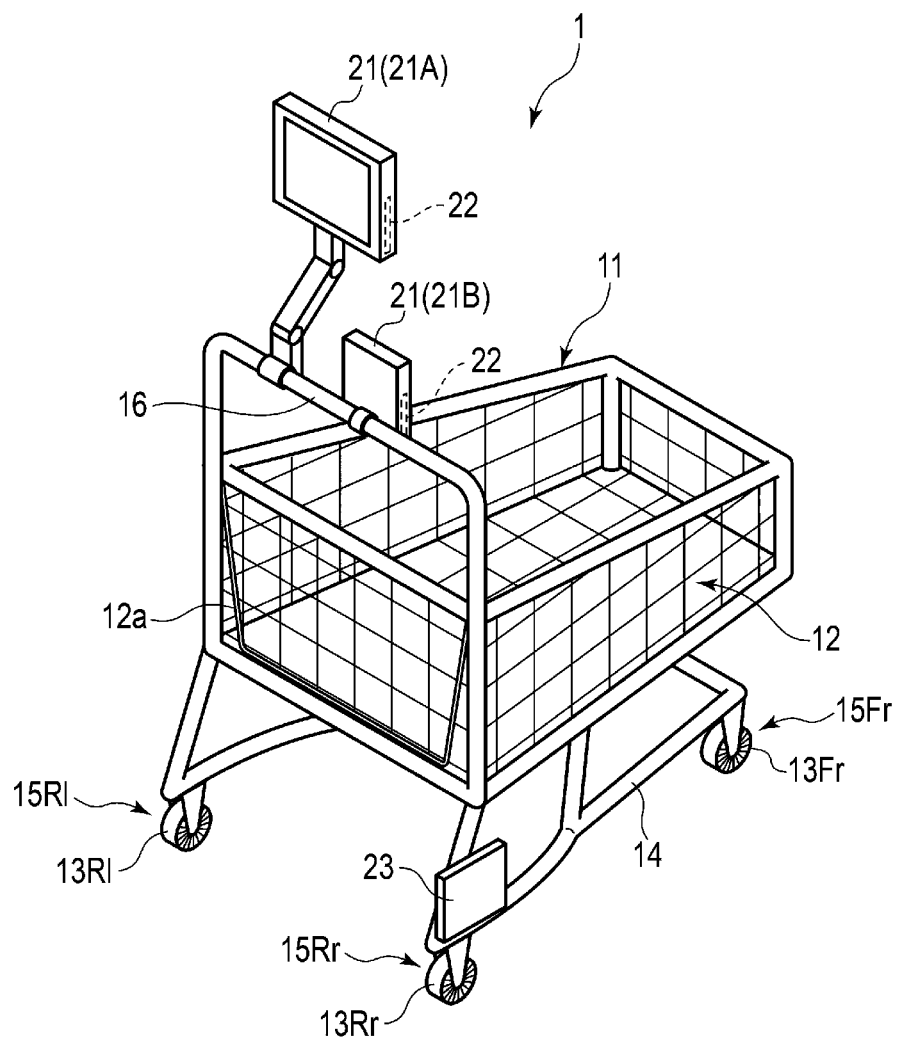
FIG. 1 is a perspective view showing an exemplary configuration of a shopping cart equipped with a battery for charging by a power transmission system according to an embodiment.

FIG. 1 is a view showing an exemplary configuration of a shopping cart 1 equipped with a battery for charging by a power transmission system according to the embodiment.

The shopping cart 1 (hereinafter, also simply referred to as a "cart") is an example of a moving object equipped with a battery for charging by the power transmission system. The power transmission system includes a system on a power transmission side (power transmission system) that transmits power contactlessly, and a system on a power reception side (power reception system) that receives the contactlessly-transmitted power.

The power reception system is a power reception device that is mounted on the cart 1 and that receives contactlessly-transmitted power. For example, the power reception system charges the battery mounted on the cart 1 with the contactlessly-received power. The power transmission system is a power transmission device that transmits power that may be received by the power reception system mounted on the cart 1. For example, the power transmission system is configured to contactlessly transmit the power to the power reception system mounted on the cart 1 stored in the storage position (cart storage area).

In addition, the battery for charging by the power transmission system mounted on the cart 1 is a power supply that supplies the power to an electronic device mounted on the cart 1, for example. The battery for charging by the power transmission system may be included in the electronic device mounted on the cart 1. Further, the battery for charging by the power transmission system may be mounted on the cart 1 as a device separate from the electronic device and may supply the power to the electronic device.

In the exemplary configuration shown in FIG. 1, the cart 1 is configured by attaching an electronic device 21 equipped with a battery 22 and a power receiver 23 to a cart main body 11 that is capable of storing and moving commodities. The cart main body 11 is configured for storing and moving the commodities by an operation of the user. The electronic device 21 is configured for providing information to a user or providing a service. The battery 22 is a power supply for operating the electronic device 21. The power receiver 23 receives the power transmitted from an external device. The electronic device 21 charges the battery 22 with the power received by the power receiver 23.

The battery 22 may be configured as a power supply (external power supply) provided separately from the electronic device 21. The battery 22 as the external power supply includes a charging circuit that charges the secondary battery with the power from the power receiver 23 and a secondary battery that stores the power. In this case, the battery 22 may be configured to supply the power stored in the secondary battery to the electronic device 21.

The cart main body 11 includes a storage basket 12 for storing commodities. The storage basket 12 is supported by a frame 14 provided with four casters 15 (15Fr, 15Fl, 15Rr, and 15Rl). The four casters 15 are provided at four lower corners of the frame 14. Each of the casters 15 (15Fr, 15Fl, 15Rr, and 15Rl) includes a wheel 13 (13Fr, 13Fl, 13Rr, 13Rl) rotating in a direction of movement. The cart main body 11 is moved as the wheels 13 of each of the casters 15 are rotated on the floor surface. Moreover, each of the casters 15 is configured to be freely rotated in a direction of rotation of the wheel 13. As a result, the direction of movement of the cart main body 11 may be freely changed.

A handle 16 is provided on one side of the storage basket 12 in the frame 14. The handle 16 is gripped by a user. For example, the user grips the handle 16 to move the cart main body 11. In this embodiment, the direction in which the storage basket 12 is pressed from the handle 16 held by the user is assumed to be the forward direction. It is assumed that the wheel 13Fr supported by the caster 15Fr is a right front wheel, and the wheel 13Fl supported by the caster 15Fl is a left front wheel, based on the forward direction. In addition, it is assumed that the wheel 13Rr supported by the caster 15Rr is a right rear wheel, and the wheel 13Rl supported by the caster 15Rl is a left rear wheel.

In addition, the lower part of the frame 14 having the four casters 15 provided at the four corners is narrow on the front side and wide on the rear side in the forward direction. For this reason, the casters 15Fr and 15Fl supporting the front wheels have narrower lateral widths than the casters 15Rr and 15Rl supporting the rear wheels. As a result, when a plurality of carts is stored sequentially in a line, the frame of a cart in back is stored to be nested along the frame of a cart in front.

In the embodiment, it is assumed that the handle 16 side of the storage basket 12 is referred to as the front side, and the opposite side is referred to as the leading end side. The storage basket 12 includes an opening and closing surface 12a that may be opened and closed with respect to a lower end of the front side surface as a free end. In addition, the storage basket 12 is formed such that the surface on the leading end side is smaller than the surface on the front side that is the opening and closing surface 12a. As a result, when a plurality of carts are stored sequentially in a line, the carts in back are stored such that the opening and closing surfaces 12a of the carts in front are pushed up and the storage baskets 12 of the carts in back and in front are nested in another.

The electronic device 21 is attached to the cart main body 11. In the exemplary configuration shown in FIG. 1, the electronic device 21 includes the battery 22 and is attached to the handle 16 of the storage basket 12. The electronic device 21 is driven by the power from the battery 22. For example, the electronic device 21 is an information terminal such as a tablet terminal for providing information to a user, or a commodity reader for acquiring information of a commodity selected by the user. In addition, the electronic device 21 may be a charging device for charging an electronic device of a portable terminal (for example, a cellular phone, a smartphone, a digital camera, and so on) carried around by the user by the power of the battery 22.

In the exemplary configuration shown in FIG. 1, as the electronic device 21, a tablet terminal 21A and a commodity reader 21B are illustrated. The tablet terminal 21A is a computer having a display unit provided with a touch panel. The tablet terminal 21A is installed with the display portion facing the user located on the handle 14 side. For example, the tablet terminal 21A displays the information of a commodity read by the commodity reader. In addition, the tablet terminal 21A may execute a payment process with respect to the commodity read by the commodity reader.

The commodity reader 21B as the electronic device 21 is configured for reading the information on the commodities. The commodity reader 21B may include a display unit that displays the read information of the commodity. For example, the commodity reader 21B is an RFID tag reader that reads an RFID tag or the like attached to the commodity to be put into and taken out of the storage basket 12. In addition, the commodity reader 21B may be a scanner that reads commodity identification information such as a barcode attached to a commodity.

In addition, as the electronic device 21, an interface device for connecting to a portable terminal (smart phone, tablet terminal and so on) carried around by the user may be provided instead of the tablet terminal 21A. The portable terminal connected to the interface device as the electronic device 21 may perform the same process as the tablet terminal 21A described above. In addition, the interface device as the electronic device 21 may charge a battery included in the portable terminal. The interface device as the electronic device 21 may have a built-in battery 22, or may be connected to the battery 22 provided separately.

The power receiver 23 is attached to the side surface of the cart main body 11. The power receiver 23 receives contactlessly-transmitted power and supplies the received power to the electronic device 21 or the battery 22. The power receiver 23 includes a power reception antenna, a circuit, and the like. The power receiver 23 is installed on the side surface of the cart main body 11 so that a power reception surface (a surface facing the antenna that transmits power) at which the power reception antenna receives power is substantially perpendicular to the floor surface. The configuration of the control system of the power receiver 23 will be described in detail below.

The power receiver 23 is installed on the side surface of the cart main body 11 to receive the power transmitted from the side of the cart main body 11. In the exemplary configuration shown in FIG. 1, the power receiver 23 is provided above the caster 15Rr that supports the rear wheel 13Rr, with the power reception surface of the power reception antenna facing the outside of the cart main body 11 being substantially perpendicular to the floor. According to the configuration shown in FIG. 1, the power receiver 23 may receive the power output from the power transmission antenna installed on the right side of the cart main body 11. In addition, the power receiver 23 may be disposed on the side surface of the cart main body 11, with the power reception surface of the power reception antenna being substantially perpendicular to the floor. The position where the power receiver 23 is provided may be designed in accordance with the arrangement of the power transmitter 32 including the power transmission antenna installed to face the power reception antenna.

Next, the configuration of a power transmission system for charging the battery 22 mounted on the cart 1 configured as described above will be described.

Figure 2:
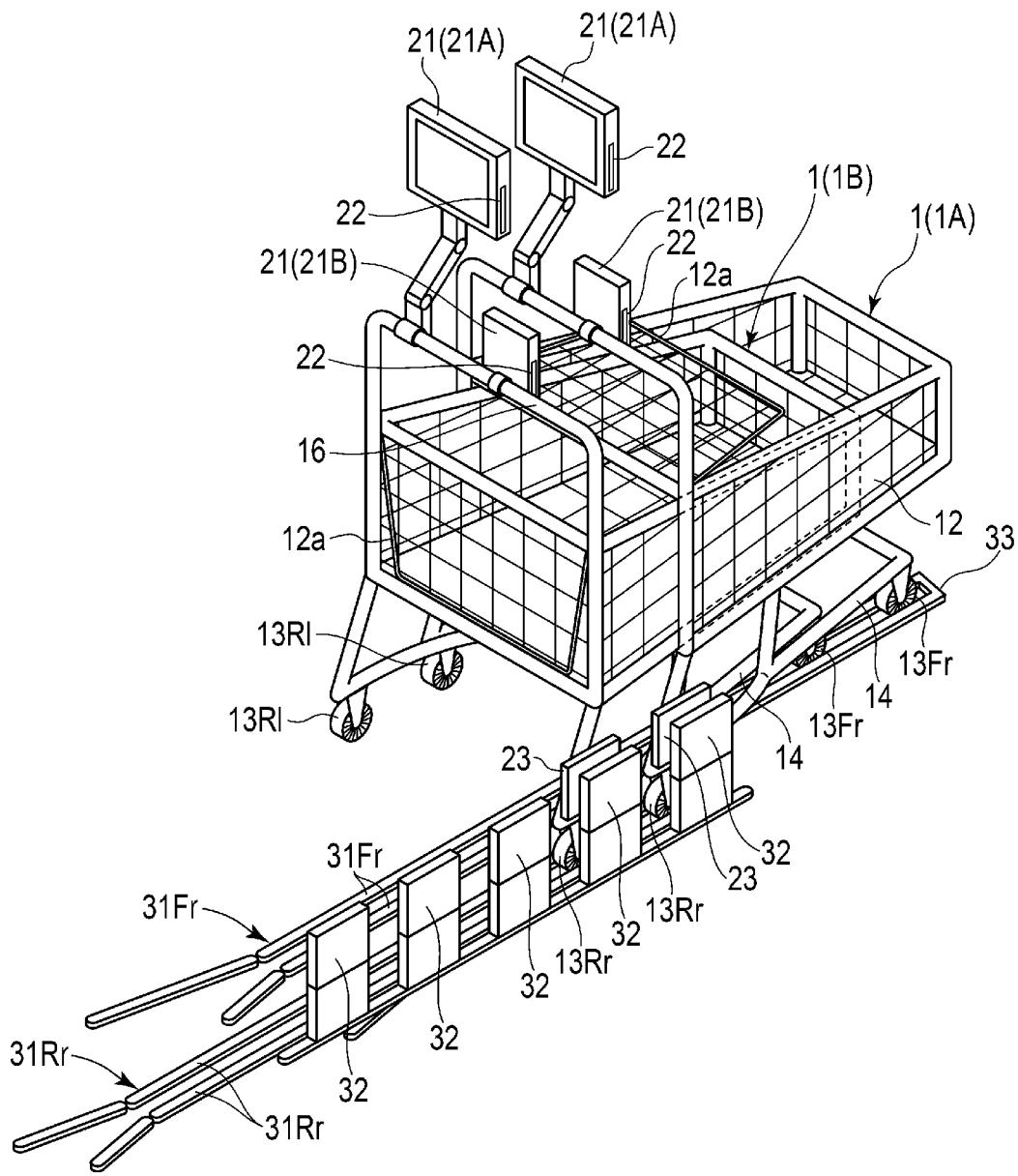
FIG. 2 is a perspective view showing a shopping cart equipped with a battery for charging by the power transmission system being stored at a storage position.

FIG. 2 is a perspective view showing a plurality of carts 1, which is mounted with the batteries 22 for charging by the power transmission system according to the embodiment, being stored in the storage position.

Each cart 1 mounted with the battery 22 is stored in a predetermined storage position (cart storage area) as shown in FIG. 2. Meanwhile, while FIG. 2 shows two carts 1 (1A and 1B) stored at the storage position, it is understood that a plurality of carts 1 are stored in a line in the storage position.

In the storage position, two guide rails 31 (31Rr and 31Fr) are provided for guiding the front and back wheels 13Rr and 13Fr on the right side among the four wheels 13 of each cart 1 to be stored. The guide rail 31 is a guide apparatus for guiding each cart 1 to a predetermined position in the storage position. In the exemplary configuration shown in FIG. 2, a guide rail 31Rr corresponding to the right rear wheel of the cart 1 and a guide rail 31Fr corresponding to the right front wheel of the cart 1 are installed.

The guide rail 31Rr guides the movement of the wheel 13Rr, that is, the right rear wheel of the cart 1. The guide rail 31Fr guides the movement of the wheel 13Fr, that is, the right front wheel of the cart 1. Each of the guide rails 31Rr and 31Fr includes a groove formed by a pair of rails. The guide rails 31Rr and 31Fr restrict the direction of movement of the wheel by causing the wheel to be moved along the groove, respectively. The guide rails 31Rr and 31Fr may include grooves formed by hollowing out the floor surface.

In addition, a wheel stopper 33 is provided at the leading end of the groove formed by the guide rail 31Fr. The wheel stopper 33 stops the wheel 13Fr of the cart 1 at a predetermined position, when the wheel 13Fr is moved along the groove of the guide rail 31Fr and stored first in the storage position. The wheel stopper 33 may be provided at the leading end of the groove formed by the guide rail 31Rr. Instead of the wheel stopper 33, a stopper such as a wall surface may be provided to stop the leading end of the cart main body 11 at a predetermined position.

In the storage position, the carts 1 are stored such that the wheels 13 are moved along the guide rails 31 and the carts in front and back are nested in another. The front side surface of the storage basket 12 of the cart 1 is the opening and closing surface 12a that may be opened and closed with respect to the lower end as a free end. In addition, the storage basket 12 is formed such that the surface on the leading end side is smaller than the surface on the front side, that is, the opening and closing surface 12a. As a result, when the leading end side of the storage basket 12 of a cart 1B in back is pushed into the opening and closing surface 12a of a cart 1A in front, the opening and closing surface 12a of the cart in front is pushed up. When the rear cart 1B is further pushed, while pushing up the opening and closing surface 12a of the front cart 1A, the storage basket 12 of the cart 1B is stored to be nested in the storage basket 12 of the cart 1A.

In addition, the frame 14 of each cart 1 is formed such that the rear side is wide and the front side is narrow in a lateral direction with respect to the direction of movement along the guide rails 31. For this reason, the casters 15Fr and 15Fl supporting the front wheels 13Fr and Fl of the cart 1 have narrower lateral width than the casters 15Rr and 15Rl supporting the rear wheels 13Rr and 13Rl. As a result, when a plurality of carts are stored sequentially in a line, the frame 14 of the cart 1B in back is stored to be nested along the frame 14 of the cart 1A in front.

As described above, the plurality of carts 1 (1A and 1B) are stored such that, when stored in the storage position, the carts in front and back are nested in another. Since the wheels are moved along the guide rails 31 in the storage position, the carts 1 are nested in accordance with the shapes of the frame 14 and the storage basket 12. When the distance between the carts 1 in front and back, which are nested and stored in the storage position, is a predetermined distance, the distance at which the power receiver 23 of each cart 1 is disposed is also the predetermined distance. That is, the carts 1 in the storage position are moved along the guide rails 31 and stored such that the carts in front and back are nested in another. Therefore, in the storage position, the power receivers 23 of the respective carts 1 are arranged at the predetermined distance according to the distance between the carts 1 in front and back in the stored state.

The power transmitter 32 outputs power which may be received by the power receiver 23 contactlessly. The power transmitter 32 includes an antenna for power transmission and a circuit for power transmission. The power transmitter 32 is installed to face the side surface of the cart main body 11 so that the power transmission surface (surface that faces the power reception antenna of the power receiver) at which the power transmission antenna outputs the power is substantially perpendicular to the floor surface. The configuration of the control system of the power transmitter 32 will be described in detail below.

In addition, the power transmitter 32 is provided at a position facing the power receiver 23 of each cart 1 while the cart 1 is stored in the storage position. In the exemplary configuration shown in FIG. 2, the power receivers 23 of the respective carts 1 stored in the storage position are arranged along the guide rails 31 at predetermined distances. For this reason, the power transmitters 32 are arranged at predetermined distances along the guide rails 31 to face the power receivers 23 of the stored carts 1.

Next, the configuration of the control system of the power transmission system will be described.

The power transmission system includes a power reception system including a power receiver 23 installed in each cart 1 and a power transmission system including a power transmitter 32 installed in a position corresponding to the position of the cart 1 at the storage position. That is, the power transmission system is a system in which the power transmitter 32 is installed in a position corresponding to the position of the cart in the storage position and transmits the power contactlessly to the power receiver 23 installed in each cart. In the power transmission system, the power transmitter 32 of the power transmission system transmits the power in a state which is not physically and not electrically connected to the power receiver 23 of the power reception system.

Figure 3:
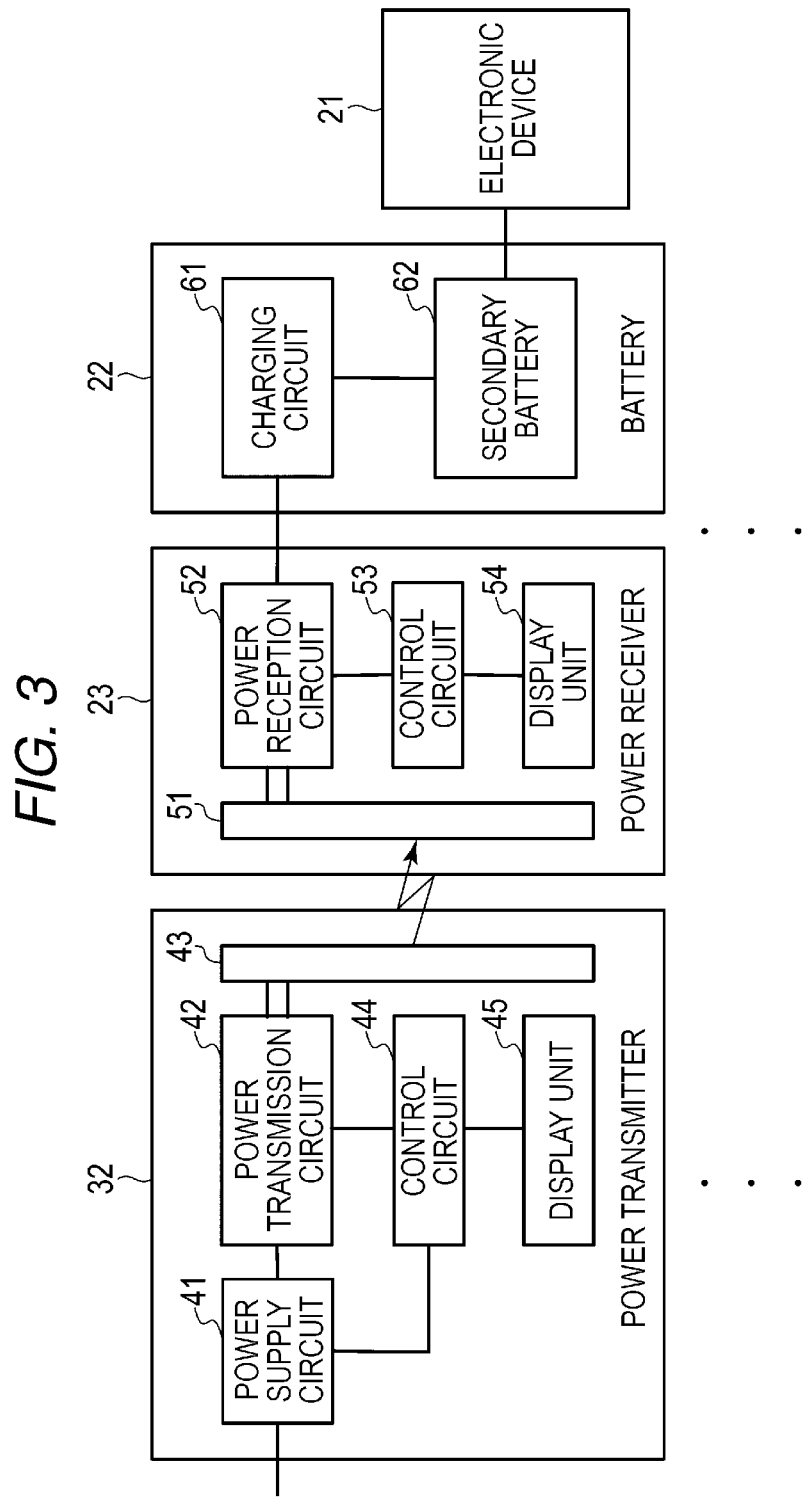
FIG. 3 is a block diagram showing an exemplary configuration of a control system of the power transmission system.

FIG. 3 is a block diagram showing an exemplary configuration of a control system of the power transmission system.

The power transmission system transmits power contactlessly, and includes a system on the power transmission side (power transmission system) and a system on the power reception side (power reception system). The power transmission system is configured for contactlessly transmitting power to the power receiver 23 mounted on each cart 1 stored in the storage position. The power reception system is configured for receiving power contactlessly with the power receiver 23 and charging the battery 22 with the received power.

The power transmission system includes a plurality of power transmitters 32 installed along the guide rails 31 in the storage position. Each of the power transmitters 32 is supplied with DC power through a DC power supply such as an AC adapter connected to a commercial power supply. The power transmitter 32 is operated either in a power transmission state in which power is supplied to the power receiver 23 or in a standby state in which power is not supplied to the power receiver 23.

In the configuration shown in FIG. 3, each of the power transmitters 32 of the power transmission system includes a power supply circuit 41, a power transmission circuit 42, a power transmission antenna 43, a control circuit 44, a display unit 45, and the like.

The power supply circuit 41 converts an external DC power supply voltage into a voltage suitable for the operation of each circuit. The power supply circuit 41 generates power for causing the power transmission circuit 42 to perform power transmission, and supplies the power to the power transmission circuit 42. In addition, the power supply circuit 41 also generates power for operating the control circuit 44 and supplies the power to the control circuit 44.

The power transmission circuit 42 generates transmission power to transmit over the power transmission antenna 43. The power transmission circuit 42 supplies the generated transmission power to the power transmission antenna 43. For example, the power transmission circuit 42 generates AC power as the transmission power by switching DC power supplied from the power supply circuit 41 based on the control of the control circuit 44.

The power transmission antenna 43 outputs the power that may be received by the power receiver 23 in accordance with the transmission power supplied from the power transmission circuit 42. The power transmission antenna 43 includes a flat power transmission surface for transmitting power. The power transmission surface of the power transmission antenna 43 is disposed to face the power reception surface of the power reception antenna 51 of the power receiver 23 while being substantially perpendicular to the floor surface.

For example, in the power transmission antenna 43, a coil for power transmission (power transmission coil) is connected in series or parallel with a resonant capacitor to form a resonant circuit (power transmission resonant circuit). When AC power is supplied from the power transmission circuit 42, the power transmission antenna 43 as a power transmission resonant circuit generates a magnetic field corresponding to the supplied AC power. The power transmission coil of the power transmission antenna 43 may be configured as a winding structure on which an insulated wire is wound, or may be configured by forming a coil pattern on a printed circuit board.

The display unit 45 is an indicator that indicates the state of the power transmitter 32. The display unit 45 switches display in accordance with the control of the control circuit 44. For example, the display unit 45 switches the display color in accordance with an operation state of the power transmitter 32. In addition, the display unit 45 may display the operation state as a message.

The control circuit 44 controls the operation of the power transmission circuit 42 and the display unit 45. The control circuit 44 includes a processor and a memory. The processor executes arithmetic processing. The processor executes various processes based on a program stored in the memory and data used in the program, for example. The memory stores the program and the data used in the program. The control circuit 44 may be configured of a microcomputer and/or an oscillation circuit, and the like.

For example, the control circuit 44 switches the display of the display unit 45 in accordance with the state of the power transmitter 32. In addition, the control circuit 44 controls the frequency of the AC power output from the power transmission circuit 42 and controls on/off of the operation of the power transmission circuit 42. For example, the control circuit 44 controls the power transmission circuit 42 to switch between a state (power transmission state) in which the power transmission coil of the power transmission antenna 43 generates a magnetic field and a state (standby state) in which the power transmission coil does not generate a magnetic field. In addition, the control circuit 44 may intermittently generate a magnetic field in the power transmission coil of the power transmission antenna 43 to perform control of changing the power to be transmitted.

The power transmitter 32 may include a wireless communication circuit for performing wireless communication. For example, the wireless communication circuit is configured to perform wireless communication at a frequency different from the frequency of power transmission. The control circuit 44 may control each part by wirelessly communicating with the power receiver 23 by a wireless communication circuit. In addition, the wireless communication circuit may perform the wireless communication at the same frequency as the frequency of power transmission using load modulation.

Next, the power reception system will be described.

The power reception system includes a power receiver 23 and a battery 22 mounted on each cart 1. The power receiver 23 includes a power reception antenna 51, a power reception circuit 52, a control circuit 53, and a display unit 54. In addition, the battery 22 includes a charging circuit 61 and a secondary battery 62. Additionally, the power receiver 23 may include an output terminal for supplying power to the electronic device 21. In this case, the battery 22 may be charged by the power supplied through the electronic device 21.

The power reception antenna 51 receives the transmitted power from the power transmission antenna 43, and supplies the received power to the power reception circuit 52. The power reception antenna 51 includes a flat power reception surface for receiving power. The power reception surface of the power reception antenna 51 is installed on the side surface of the cart main body 11 while being substantially perpendicular to the floor surface.

For example, in the power reception antenna 51, a coil for power reception (power reception coil) is connected in series or parallel with a capacitor to form a resonant circuit (power reception resonant circuit). When the power reception antenna 51 as the power reception resonant circuit approaches the power transmission antenna 43 of the power transmitter 32, the power reception coil is electromagnetically coupled to the power transmission coil of the power transmission antenna 43. The power reception coil of the power reception antenna 51 generates an induced current by the magnetic field output from the power transmission coil of the power transmission antenna 43 of the power transmitter 32. The power reception coil may be configured as a winding structure on which an insulated wire is wound, or may be configured by forming a coil pattern on a printed circuit board.

The power reception antenna 51 as a power reception resonant circuit supplies the received AC power to the power reception circuit 52. In other words, while receiving the AC power from the power transmitter 32, the power reception antenna 51 serves as an AC power supply. In addition, when the magnetic field resonant method is used for the power transmission, the self-resonant frequency of the power reception resonant circuit as the power reception antenna 51 is substantially the same as the frequency transmitted by the power transmitter 32. As a result, the power transmission efficiency is improved when the power reception coil of the power reception antenna 51 and the power transmission coil of the power transmission antenna 43 are electromagnetically coupled.

The power reception circuit 52 converts the reception power supplied from the power reception antenna 51 into power that may be supplied to the battery 22 or the electronic device 21. For example, the power reception circuit 52 rectifies and converts the reception power supplied from the power reception antenna 51 into direct current. Such a power reception circuit 52 is realized by a circuit including a rectifying bridge including a plurality of diodes, for example. In this case, a pair of input terminals of the rectifying bridge is connected to the power reception resonant circuit as the power reception antenna 51. The power reception circuit 52 performs full-wave rectification on the reception power supplied from the power reception antenna 51 to output DC power from the pair of output terminals.

The display unit 54 displays various types of information. For example, the display unit 54 is an indicator that indicates the state of the power receiver 23. The display unit 54 switches display in accordance with the control of the control circuit 53. For example, the display unit 54 switches a display color in accordance with the operation state of the power receiver 23. In addition, the display unit 54 may display the operation state as a message.

The control circuit 53 controls the operation of the power reception circuit 52 and the display unit 54. The control circuit 53 includes a processor and a memory. The processor executes arithmetic processing. The processor executes various processes based on a program stored in the memory and data used in the program, for example. The memory stores the program and the data used in the program. The control circuit 53 may be configured of a microcomputer and/or an oscillation circuit, and the like. For example, the control circuit 53 switches display of the display unit 54 in accordance with the state of the power receiver 23.

The power receiver 23 may include a wireless communication circuit for performing wireless communication with the corresponding power transmitter 32. For example, the wireless communication circuit performs wireless communication at a frequency different from the frequency of power transmission. The control circuit 53 may control each part by wirelessly communicating with the power transmitter 32 by a wireless communication circuit. In addition, the wireless communication circuit may perform the wireless communication at the same frequency as the frequency of power transmission using load modulation.

The charging circuit 61 supplies the power supplied from the power reception circuit 52 of the power receiver 23 to the secondary battery 62 as power for charging (charging power). For example, the charging circuit 61 converts the power supplied from the power reception circuit 52 into the direct current (charging power) for use in charging the secondary battery 62. That is, the charging circuit 61 converts the power supplied from the power reception circuit 52 into the charging power of a predetermined current value and voltage value for charging the secondary battery 62, and supplies the charging power to the secondary battery 62.

The secondary battery 62 is charged by the charging power supplied from the charging circuit 61. In addition, the secondary battery 62 is connected to the electronic device 21 and supplies power to the electronic device 21.

Next, the guide apparatus for guiding the cart 1 to the storage position, and the positional relationship between the power receiver 23 installed on the cart 1 and the power transmitter 32 will be described.

In order to transmit power contactlessly between the power transmitter 32 and the power receiver 23, alignment of the power transmission antenna and the power reception antenna is required. In contactless power transmission, a more accurate alignment between the transmission antenna and the power reception antenna allows a higher power transmission efficiency. For example, the power transmission antenna (power transmission coil) contactlessly transmits power to the power reception antenna (power reception coil) by using magnetic field coupling such as electromagnetic induction or magnetic field resonance. In contactless power transmission using such magnetic field coupling, power may not be transmitted unless the position of the power transmission coil matches the position of the power reception coil.

Figure 4:
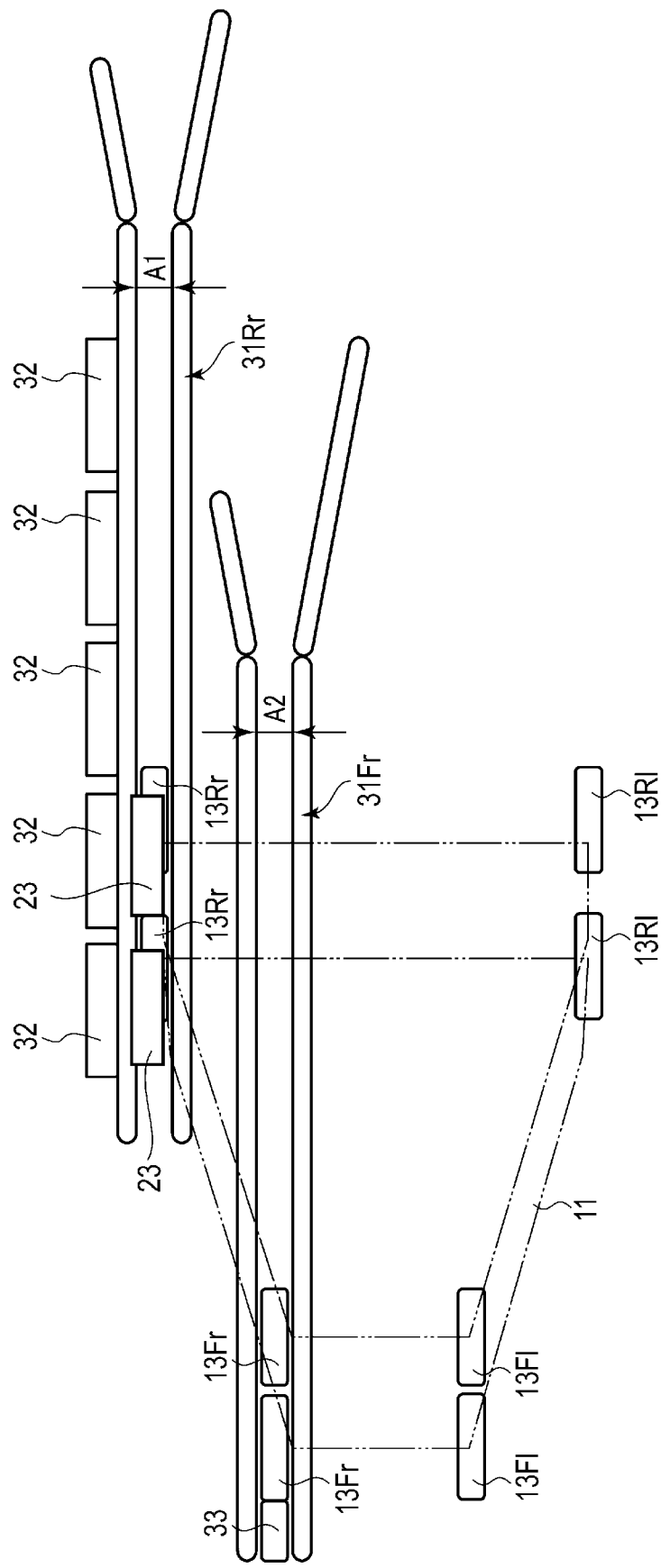
FIG. 4 is a view showing a first exemplary arrangement of a guide rail as a guide apparatus in the power transmission system.

FIG. 4 is an example of a top view of the power receiver 23 and the power transmitter 32 installed on the cart 1 viewed from above, in which the cart 1 is moved along the guide rails 31Rr and Fr and stored in the storage position.

In the power transmission system according to the embodiment, the power transmitter 32 transmits power to the power receiver 23 provided in the cart 1 stored in the storage position. Therefore, the power transmitter 32 is disposed at a position corresponding to the position of the cart 1 stored in the storage position (the position of the power receiver 23 provided on the side surface of the cart 1). FIG. 4 shows the position of the power receiver 23 provided on the side surface of each cart 1 stored in the storage position, and the plurality of power transmitters 32 disposed at the position of facing the power receiver 23 of the cart.

In the storage position, the cart 1 is stored to be nested in the cart stored earlier. The stop position of the cart 1 stored first in the storage position is fixed by a wheel stopper 33 provided on the guide rail 31Fr. For this reason, the second and subsequent carts 1 are stored sequentially in a line while being nested in the preceding carts in the storage position. When the distance between the carts 1 in front and back in the nested state is a predetermined front and back distance, the power receivers 23 of the respective carts 1 stored in the storage position are also arranged at the predetermined distance. Accordingly, the plurality of power transmitters 32 are respectively arranged on the side of carts 1 at distances in accordance with the distance between the carts in front and back stored in the storage position. As a result, the plurality of power transmitters 32 may transmit power toward the side surface of each cart 1 at a position facing each power receiver 23 of the plurality of carts 1 stored in the storage position.

That is, each cart 1 mounted with the battery 22 is provided with the power receiver 23 including the power reception antenna 51 on the side surface of each cart main body 11 so that the power reception surface is substantially perpendicular to the floor surface. In addition, the power transmitter 32 is installed at a position facing the power reception antenna 51 of each cart 1 stored in the storage position so that the power transmission surface of the power transmission antenna 43 is substantially perpendicular to the floor. With such a configuration, no foreign object is placed on the power transmission surface of the power transmission antenna, and the possibility of foreign object being inserted between the power reception antenna and the power transmission antenna is reduced. As a result, it is possible to realize a power transmission system capable of safely performing contactless power transmission without generating heat and the like caused by foreign object such as metal.

In addition, in the exemplary configuration shown in FIG. 4, the guide rail 31Rr and the guide rail 31Fr are guide apparatuses for guiding the cart 1 to the storage position.

The guide rail 31Rr restricts the traveling direction of the wheel 13Rr of the cart 1 to guide the wheel 13Rr as the first wheel to the storage position. The wheel 13Rr is the one that is positioned closest to the power transmitter 32 among the plurality of wheels included in the cart 1 while the cart 1 is stored in the storage position. In the cart 1 having the configuration shown in FIG. 1, the wheel 13Rr is also the one that is closest to the power receiver 23 among the plurality of wheels included in the cart 1.

The guide rail 31Fr restricts the traveling direction of the wheel 13Fr of the cart 1 to guide the wheel 13Fr as the second wheel to the storage position. The wheel 13Fr is moved on a movement path closest to the movement path of the first wheel when the cart 1 is moved to the storage position. The guide rail 31Fr is provided adjacent to the guide rail 31Rr.

In the exemplary configuration shown in FIG. 4, the guide rail 31Rr and guide rail 31Fr guide the front wheel and the rear wheel on the right side (closer side to the power transmitters 32) of the cart 1 with respect to the direction of movement to the storage position. The right side of the cart 1 is the side on which the power transmitters 32 are installed (the side on which the power receiver 23 is installed in the cart main body 11) while the cart 1 is stored in the storage position. In other words, in the exemplary configuration shown in FIG. 4, the movement of the front and back wheels on the side of the cart 1 on which the power receiver 23 is provided is guided by two rails.

Generally, a shopping cart includes a frame formed of a member such as iron or aluminum, and a clearance (track) of each of the wheels attached to the frame has an error of about several millimeters. It poses a challenge to install the guide rails corresponding to each of the four wheels (front, rear, left, and right wheels) based on only the wheel width when the manufacturing error in the clearances of the wheels is larger (when the accuracy is lower). It is assumed that four guide rails including a groove having a groove width of 30 mm are provided in consideration of a margin of about 11% for four wheels having a wheel width of 27 mm. In this case, when an error exceeds 3 mm in the clearances of the left and right wheels attached to the cart 1, entrance into the guide rail may not be possible.

In FIG. 4, the guide rails 31Rr and 31Fr are installed for the wheels 13Rr and 13Fr on the side where the power transmitters 32 are installed, while no guide rails are installed for the wheels 13Rl and 13Fl. When the cart 1 is stored in the storage position or when the cart 1 is pulled out from the storage position, the movement path of the wheel 13Rr and the movement path of the wheel 13Fr are adjacent to each other. Therefore, the error in the clearances of the wheel 13Rr and the wheel 13Fr due to the manufacturing variation of the cart 1 is not that significant. Therefore, the wheels 13Rr and 13Fr may be moved into the grooves of the guide rails 31Rr and 31Fr.

In addition, it is necessary to bring the power reception antenna 51 of the power receiver 23 and the power transmission antenna 43 of the power transmitter 32 close to each other so that the power transmission may be performed efficiently. For this reason, the guide rails 31Rr and 31Fr are installed to guide the wheels 13Rr and 13Fr on the side where the power transmitters 32 are installed. In the guide rails 31Rr and 31Fr, in order to allow the power receiver 23 and the power transmitters 32 to approach each other as close as possible, the grooves for guiding the respective wheels have a minimum groove width A1, A2 as required in accordance with the wheel width. For example, in a case in which the guide rails 31Rr and 31Fr have grooves formed in consideration of a margin of about 11% with respect to a wheel width of 27 mm, the groove widths A1 and A2 may be about 30 mm.

Next, a modification of the power transmission system (power transmission device) on the power transmission side of the power transmission system will be described.

As described above, any power transmission system in the power transmission system will suffice when the system is capable of transmitting power to the respective power receivers 23 of the plurality of carts 1 stored in the storage position. For example, one power transmitter may be configured as the power transmitters 32 of the power transmission system.

Figure 5:
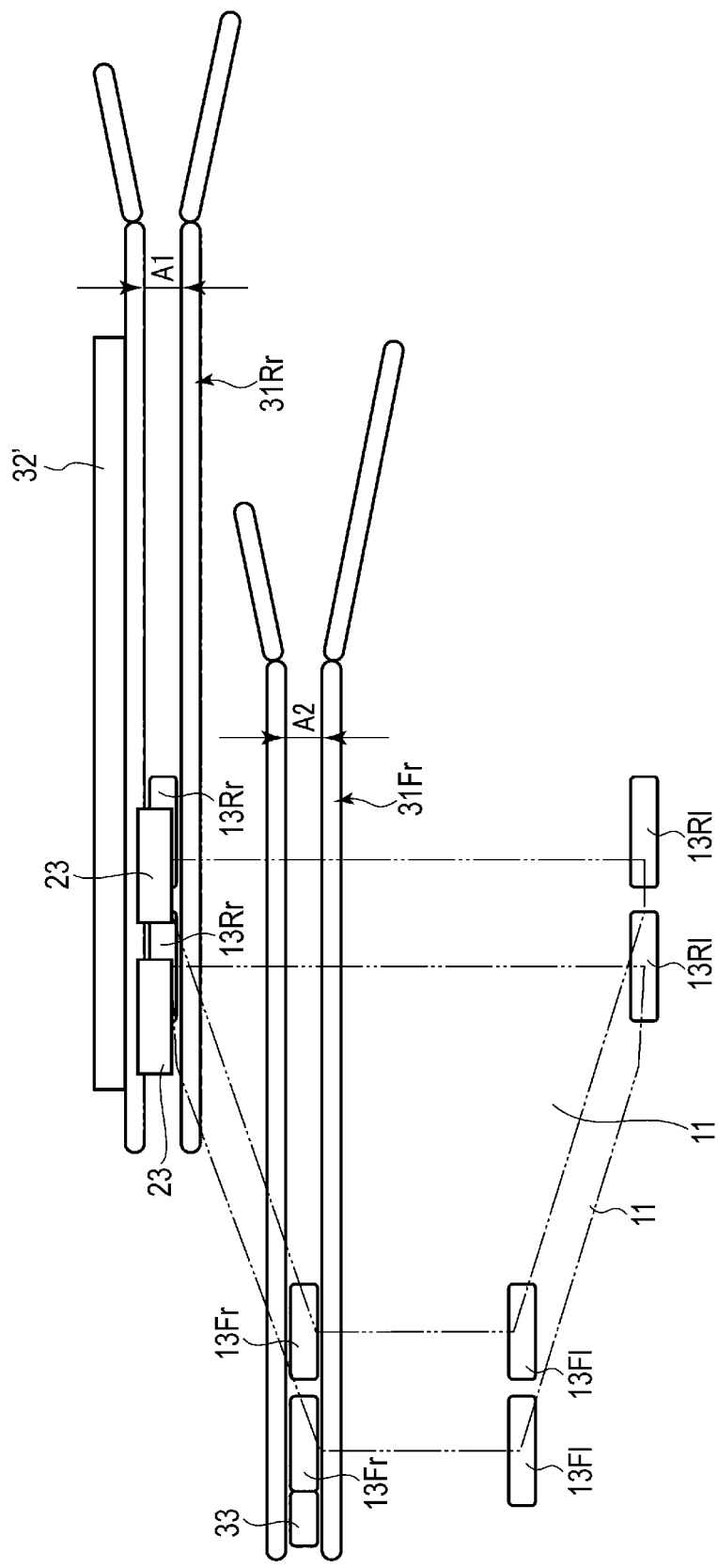
FIG. 5 is a view showing a modification of a power transmitter in the power transmission system.

FIG. 5 is a view showing a power transmitter 32' as a modification of a plurality of power transmitters 32 in the power transmission system shown in FIG. 4.

In the modification shown in FIG. 5, one power transmitter 32' is provided for transmitting power to a region that includes positions facing all the power receivers 23 of the plurality of carts stored in the storage position. In the storage position, the plurality of carts 1 are stored sequentially in a line along the guide rails 31. Therefore, the power transmitter 32' has a band-like power transmission surface substantially perpendicular to the floor surface so that power may be transmitted to the respective power receivers 23 of the plurality of carts that may be stored in the storage position. In this case, as shown in FIG. 5, the power transmitter 32' may be disposed along the guide rails 31 with the band-like power transmission surface being directed to the side surface of each cart 1.

Figure 6:
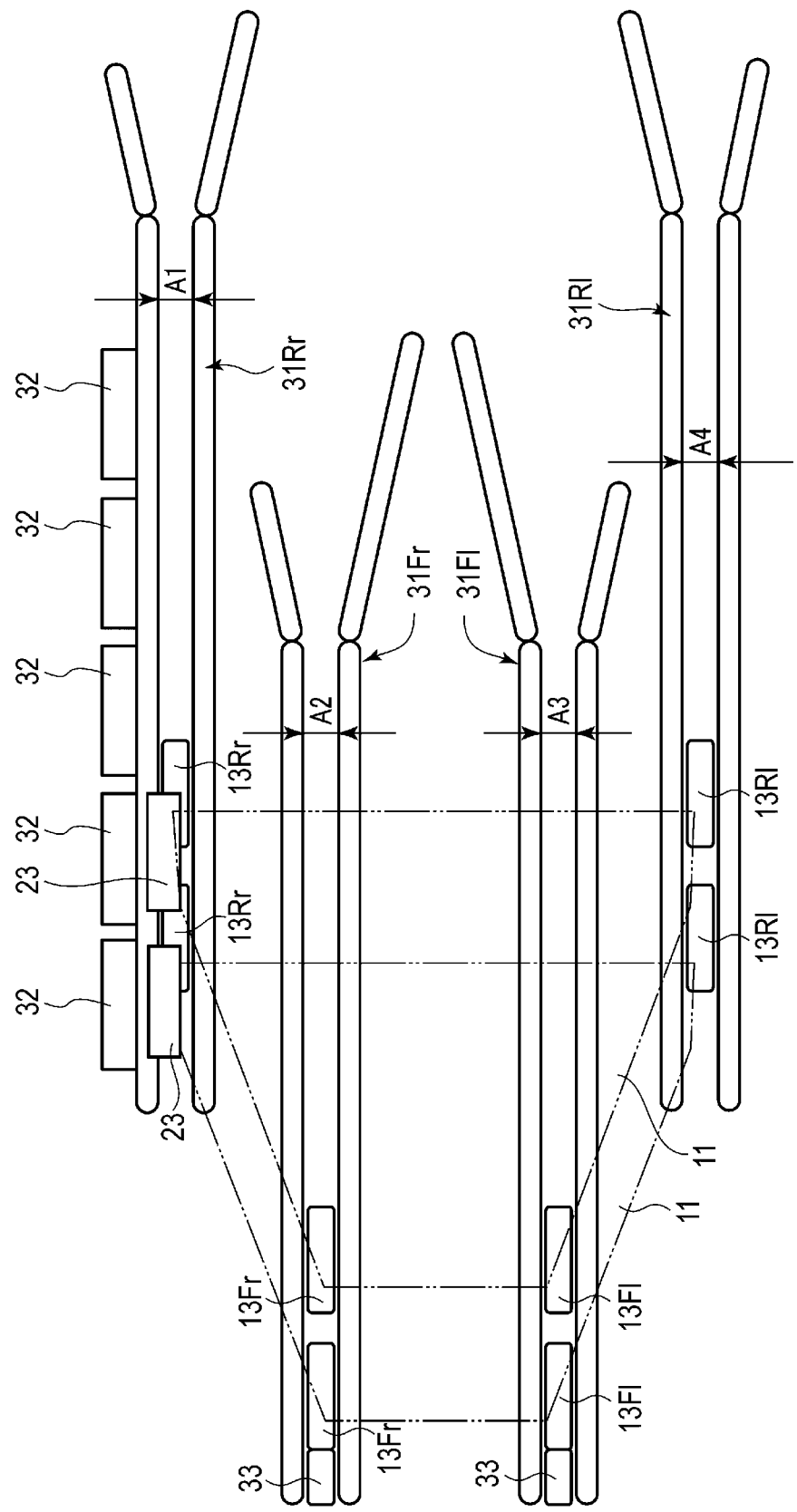
FIG. 6 is a view showing a second exemplary arrangement of a guide rail as a guide apparatus in the power transmission system.

FIG. 6 is a view showing an exemplary configuration in which two guide rails 31Fl and 31Rl are added to the power transmission system shown in FIG. 4.

Depending on the shape of the cart 1, the operation (traveling direction and so on) of the cart 1 may be unstable with only two guide rails 31Rr and 31Fr provided on the power transmitter 23 side as shown in FIG. 4. In such a case, as shown in FIG. 6, the power transmission system may further include a guide rail for guiding the wheels (front wheels, rear wheels, or both the front and rear wheels) on the side away from the power transmitter.

In FIG. 6, in addition to the guide rails 31Rr and 31Fr, guide rails 31Fl and 31Rl are provided for guiding the front wheel 13Fl and the rear wheel 13Rl on the left side of the cart 1 (the side away from the power transmitters 32). The individual carts 1 have manufacturing errors as described above, and have variations in the clearance (track) between the left and right wheels. For this reason, it is necessary to install a guide rail for guiding the wheels (front and rear wheels) on the side away from the power transmitter 32 in consideration of a margin corresponding to a manufacturing error (accuracy) of the cart 1.

That is, it is difficult to increase the width of the groove in the guide rails for guiding the wheels on the side closer to the power transmitter, since the distance between the receiver and the transmitters is set within a range that allows a good power transmission. For this reason, the guide rails for guiding the wheels (front and rear wheels) on the side away from the power transmitter have a wider groove width than the guide rails for guiding the wheels closer to the power transmitters in consideration of track variations. For example, the groove width A3 of the guide rail 31Fl is formed wider than the groove width of the guide rail 31Rr in consideration of the accuracy of the mounting position of the wheel 13Fl with respect to the wheel 13Rr. In addition, the groove width A4 of the guide rail 31Rl is formed wider than the groove width of the guide rail 31Rr in consideration of the accuracy of the mounting position of the wheel 13Rl with respect to the wheel 13Rr.

As a result, the guide rails on the side away from the power transmitter may absorb the variations in the clearance (track) between the wheels of the plurality of carts and guide the wheels of each cart reliably. That is, the guide rail on the side closer to the power transmitter may be realized to ensure that the distance between the power receiver and the power transmitter is kept within a predetermined range, and the guide rail on the side away from the power transmitter may be realized to stabilize the movement of the cart. As a result, the cart may be moved stably, and power may be stably transmitted between the power receiver and the power transmitter.

In FIG. 4, the guide rail 31Rr closest to the power transmitters and the guide rail 31Fr adjacent to the guide rail 31Rr are described. Since the guide rail 31Rr and the guide rail 31Fr are disposed adjacent to each other, the influence of the mounting accuracy of the wheel 13Rr and the wheel 13Fr is not that significant. Therefore, the groove width A1 of the guide rail 31Rr and the groove width A2 of the guide rail 31Fr may be the same.

Meanwhile, strictly speaking, the clearances of the wheel 13Rr and the wheel Fr also vary due to the variation according to the mounting accuracy of each cart 1. Therefore, the groove width A2 of the guide rail 31Fr may be wider than the groove width A1 of the guide rail 31Rr closest to the power transmitters 32. For example, when the groove width A1 of the guide rail 31Rr closest to the power transmitter 32 has a minimum margin for the wheel width b, the groove width A2 of the guide rail 31Fr is formed wider than the groove width A1. As a result, the groove width A1 of the guide rail 31Rr may be formed narrow, and the guide rail 31Fr may be formed so as to prevent the movement of the cart 1 from being impeded.

Next, the configuration of the guide rails 31 for guiding the wheels 13 of the cart 1 will be described in detail.

The guide rail 31Rr restricts the direction of movement of the wheel 13Rr of the cart 1 that is closest to the power transmitter 32, so that the power transmission surface of the power transmission antenna and the power reception surface of the reception antenna are brought close to each other. Generally, in contactless power transmission using magnetic field coupling, the required range of proximity between the coil of the power transmission antenna and the coil of the power reception antenna is determined in accordance with the size of the coil. For example, when the coil of the power transmission antenna and the coil of the power reception antenna are about 10 cm square, it is necessary to bring the coils close to each other to less than about 10 to 20 mm in order to perform good power transmission. In the power transmission system according to this embodiment, the power transmission antenna of the power transmitter 32 is installed on the side of the cart 1 stored in the storage position, while facing the power reception antenna on the side surface of the cart 1. Therefore, the guide rail 31Rr guides the wheel 13Rr such that the distance between the power reception antenna of the power receiver 23 and the power transmission antenna of the power transmitter 32 is less than about 10 to 20 mm.

Meanwhile, the guide rails 31Fr, 31Rl, and 31Fl other than the guide rails 31Rr guide the wheels 13Fr, 13Rl, and 13Fl in order to stabilize the traveling direction of the cart main body 11. The groove widths of the guide rails 31Fr, 31Rl, and 31Fl are set in consideration of variations due to the mounting accuracy of the wheels or the like. A greater groove width of the groove formed by the guide rail 31 allows an easier entrance of the wheel 13 into the groove. However, when moving the cart main body 11 in a predetermined direction of movement, and when the groove width is too large, the traveling direction of the wheels 13 may be greatly changed, making it difficult to move in the predetermined direction of movement.

Therefore, each guide rail 31 in the power transmission system according to the present embodiment is set with the groove width in consideration of the relationship between the groove width and the ease of movement of the cart 1.

Next, the relationship between the guide rails 31 and the wheels 13 will be described.

Figure 7:
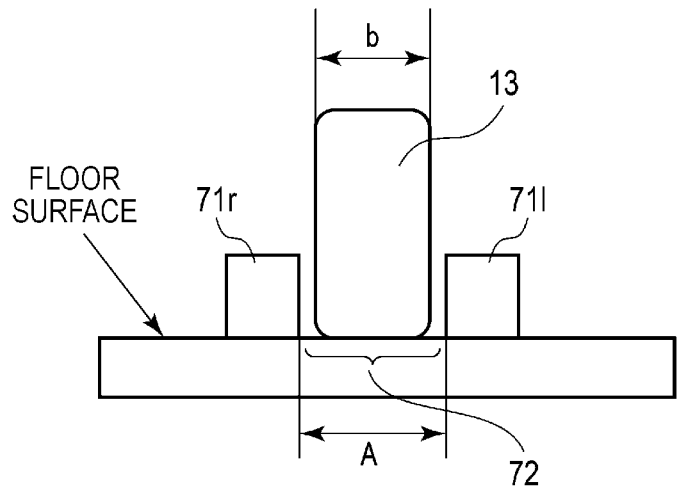
FIG. 7 is a view showing a relationship between a structure of guide rails and wheels in the power transmission system.

FIG. 7 is a view showing the relationship between the guide rails 31 and the wheels 13 of the cart 1.

As shown in FIG. 7, the guide rail 31 includes a groove 72 formed by a pair of rails 71 (71r, 71l). The rail 71r and the rail 71l are installed in parallel to form a linear groove 72. The wheel 13 is moved along the linear groove 72 formed by the rail 71r and the rail 71l. That is, the guide rail 31 is a guide for moving the wheel 13 in a predetermined direction of movement by the groove 72 provided in the predetermined direction of movement. As a result, the direction of movement of the wheel 13 is restricted by the groove 72 of the guide rail 31, and the direction of movement of the cart main body 11 is restricted. The guide rail 31 may include the groove 72 formed by hollowing out the floor surface. In this case, the inner surface of the groove 72 corresponds to the facing surfaces (inner walls) of the rail 71r and the rail 71l.

As shown in FIG. 7, the width (groove width) A of the groove 72 is a distance between the facing surfaces (inner walls) of the rail 71r and the rail 71l. In addition, the width b of the wheel 13 (wheel width) is a width in the direction orthogonal to the rotation direction of the wheel 13. The guide rail 31 is formed such that the groove width A is greater than the wheel width b to allow the wheel 13 to be moved in the groove 72. A greater groove width A with respect to the wheel width b allows a greater degree of freedom of movement of the wheel 13 in the groove 72 and a greater variation in position.

For example, the guide rail 31Rr restricts the movement of the wheel 13Rr within a contactless power transmittable range. That is, with respect to the wheel width of the wheel 13Rr, the guide rail 31Rr has a groove width A1 such that the distance between the power receiver 23 and the power transmitter 32 is within the contactless power transmittable range. On the other hand, the guide rails 31Fr, 31Rl, and 31Fl (guide rails other than guide rail 31Rr) have a groove width in consideration of the variation of the track of each wheel of the cart 1, to make it easy for the cart to move in a predetermined moving direction.

In addition, each wheel 13 is supported by the caster 15 so that the traveling direction (the moving direction by the rotation of the wheels) may be freely changed. For example, the traveling direction of the wheel 13 is changed in accordance with the force exerted on the cart main body 11 by the user who is gripping the handle 16. The range of changing the traveling direction of the wheel 13 in the groove 72 is determined in accordance with a difference between the wheel width b and the groove width A. That is, a greater difference between the wheel width b and the groove width A allows a greater inclination of the traveling direction of the freely-rotating wheel 13 with respect to the direction of the groove 72 (predetermined direction of movement). In this example, the maximum value of the inclination allowed for the wheel 13 with respect to the predetermined direction of movement formed by the groove 72 (the inner wall surfaces of each of the rails 71r and 71l) is referred to as a "wheel angle (θ)". That is, a greater groove width A allows a greater wheel angle (θ).

As the wheel angle (θ) increases, the inclination of the traveling direction of the wheel 13 in the groove 72 increases, and it is difficult to move the cart main body 11 in a predetermined direction of movement. It is assumed that the shopping cart 1 is stored in the storage position and pulled out from the storage position by an operation of an unspecified user. For this reason, the guide rail 31 has a groove 72 that makes the distance between the power receiver 23 and the power transmitter 32 within the contactless power transmittable range, and that allows the user to move the cart 1 with ease.

FIGS. 8 to 12 are views illustrating the relationship between the groove width A and the movement of the wheel in the groove.

Figure 8:
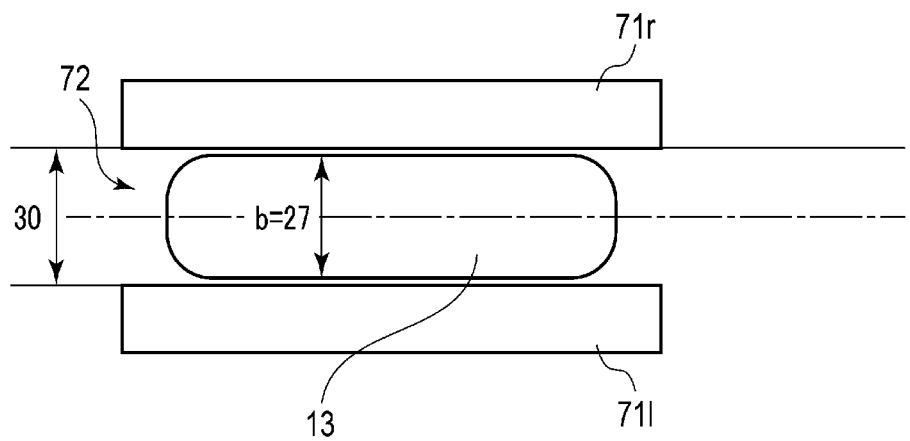
FIG. 8 is a view showing a first example showing a relationship between a width of a groove of guide rails and wheels in the power transmission system.

In addition, in FIGS. 8 to 12, it is assumed that the wheel width b is 27 mm. FIG. 8 shows how the wheel 13 is rotated in the groove 72 when the groove width A of the guide rail 31 is 30 mm. When the wheel width b is 27 mm and the groove width A is 30 mm, the groove width A has an increase rate of 11.1% with respect to the wheel width b. In this case, the possible traveling direction of the wheel 13 in the groove 72 is less than 3 degrees with respect to the surface of the inner walls of the rail 71. As a result, it is considered that the traveling direction of the wheel 13 is not largely deviated from the predetermined direction of movement, so that the cart main body 11 may be moved reliably in the predetermined direction of movement.

Figure 9:
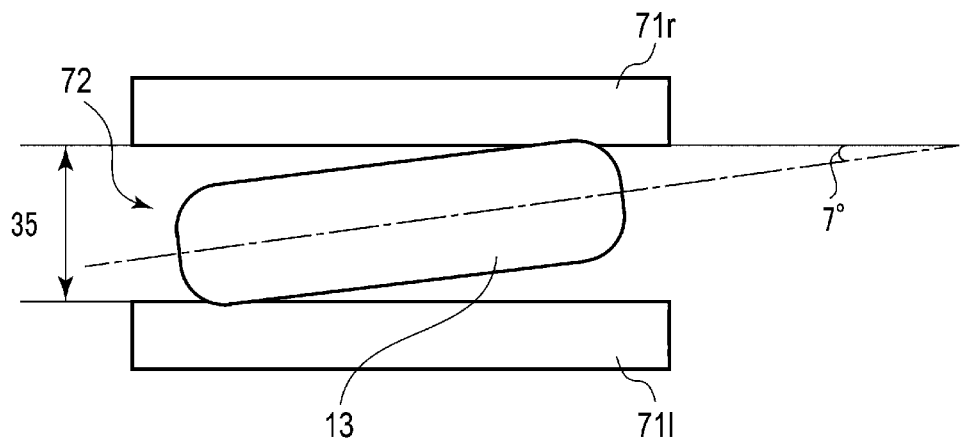
FIG. 9 is a view showing a second example showing a relationship between a width of a groove of guide rails and wheels in the power transmission system.

FIG. 9 shows how the wheel 13 having a wheel width b of 27 mm is rotated in the groove 72 when the groove width A of the guide rail 31 is 35 mm.

When the wheel width b is 27 mm and the groove width A is 35 mm, the groove width A has an increase rate of 29.6% with respect to the wheel width b. In this case, the maximum possible traveling direction of the wheel 13 in the groove 72 is about 7 degrees with respect to the surface of the inner walls of the rail 71. When the traveling direction of the wheel 13 is inclined by about 7 degrees maximum, the wheels 13 are moved along the predetermined direction of movement while being corrected in the traveling direction by being collided against the inner walls of the rail 71r or 71rl. Within the maximum inclination of about 7 degrees, it is considered that the traveling direction of the wheel 13 is easily corrected by being collided against the inner walls of the rail 71r or 71rl.

Figure 10:
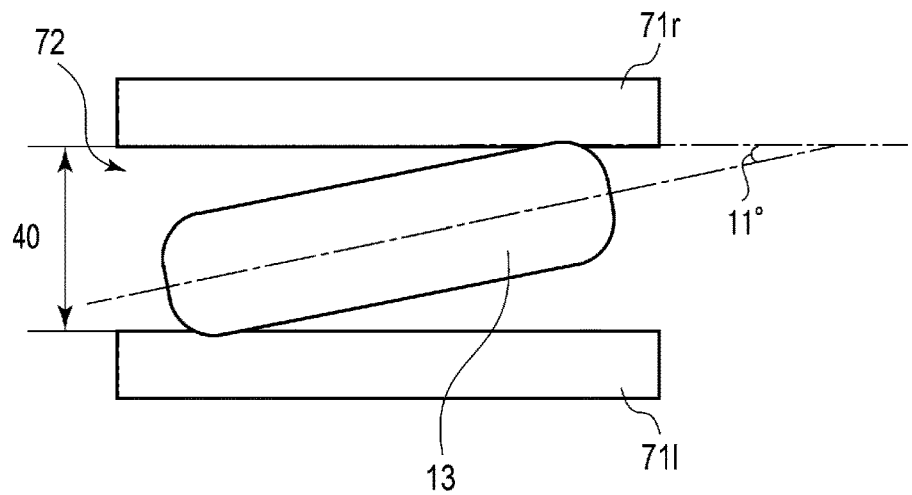
FIG. 10 is a view showing a third example showing a relationship between a width of a groove of guide rails and wheels in the power transmission system.

FIG. 10 shows how the wheel 13 having a wheel width b of 27 mm is rotated in the groove 72 when the groove width A of the guide rail 31 is 40 mm.

When the wheel width b is 27 mm and the groove width A is 40 mm, the groove width A has an increase rate of 48.1% with respect to the wheel width b. In this case, the maximum possible traveling direction of the wheel 13 in the groove 72 is about 11 degrees with respect to the surface of the inner walls of the rail 71. When the traveling direction of the wheel 13 is inclined by about 11 degrees maximum, the wheel 13 is corrected in the traveling direction thereof by being collided against the inner walls of the rail 71r or 71rl. However, in order to correct the traveling direction of the wheels 13 collided against the inner walls of the rails 71r and 71Rl at an inclination of about 11 degrees, it is considered necessary to operate the cart main body 11 with a strong force. In this case, it is considered that the user operating the cart 1 move the cart 1 in a predetermined direction of movement with a feeling of resistance.

Figure 11:
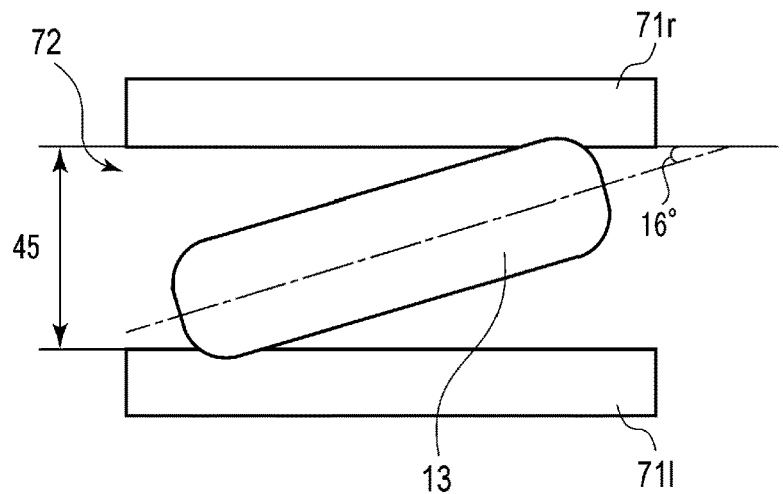
FIG. 11 is a view showing a fourth example showing a relationship between a width of a groove of guide rails and wheels in the power transmission system.

FIG. 11 shows how the wheel 13 having a wheel width b of 27 mm is rotated in the groove 72 when the groove width A of the guide rail 31 is 45 mm.

When the wheel width b is 27 mm and the groove width a is 45 mm, the groove width A has an increase rate of 66.7% with respect to the wheel width b. In this case, the maximum possible traveling direction of the wheel 13 in the groove 72 is about 16 degrees with respect to the surface of the inner walls of the rail 71. When the wheel 13 is collided against the inner walls of the rail 71r or 71rl at a large angle, it is difficult to correct the traveling direction in the direction of movement. For example, it is considered that, when the angle of colliding against the inner walls of the rail 71 is 16 degrees, it is difficult to change the traveling direction of the wheel 13 in the groove 72. When it is difficult to change the traveling direction of the wheels 13 in the groove 72, it is difficult for the user to move the cart main body 11 in a predetermined direction of movement.

Figure 12:
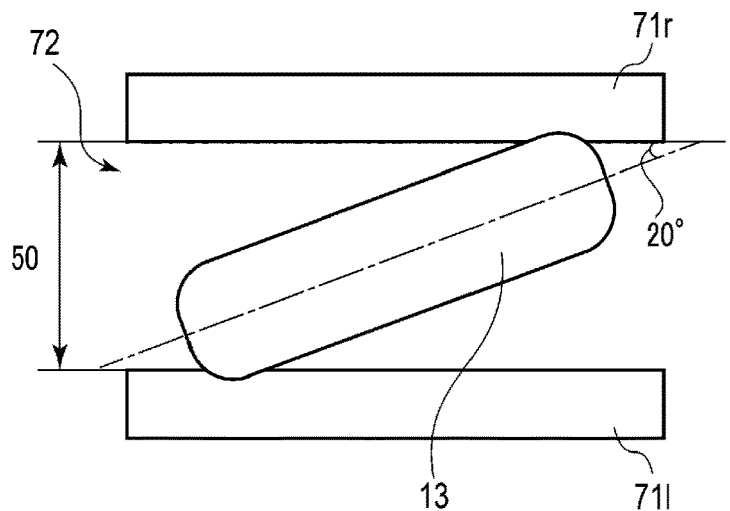
FIG. 12 is a view showing a fifth example showing a relationship between a width of a groove of guide rails and wheels in the power transmission system.

FIG. 12 shows how the wheel 13 having a wheel width b of 27 mm is rotated in the groove 72 when the groove width A of the guide rail 31 is 50 mm.

When the wheel width b is 27 mm and the groove width A is 50 mm, the groove width A has an increase rate of 85.1% with respect to the wheel width b. In this case, the maximum possible traveling direction of the wheel 13 in the groove 72 is about 20 degrees with respect to the surface of the inner walls of the rail 71. For example, when the angle of colliding against the inner walls of the rail 71 is 20 degrees, it is difficult to change the traveling direction of the wheel 13 in the groove 72. Furthermore, when the user tries to operate the cart main body 11 with a strong force, the wheels 13 may ride on the rail 71.

FIG. 13 is a diagram showing experimental results of subjective evaluation of ease of pulling out with respect to the wheel angle according to the groove width and the wheel width.

The experimental result shown in FIG. 13 shows the subjective evaluation when the test subject pulls out the cart 1 having a wheel having a wheel width b of 27 mm along the grooves 72 of various groove widths exemplified in FIGS. 8 to 12. According to the experimental results shown in FIG. 13, the ease of pulling out in the predetermined direction of movement is good when the groove width is 30 mm or 35 mm. In addition, even when the groove width is 40 mm, the test subject is able to pull out in a predetermined direction of movement with a feeling of resistance. In addition, when the groove width is 45 mm and 50 mm, it is evaluated that it is difficult to pull out in the predetermined direction of movement.

Therefore, according to the experimental results shown in FIG. 13, it is considered that the groove width a of the guide rail 31 needs to be 40 mm or less for the cart 1 having a wheel width b of 27 mm (increase rate to wheel width is equal to or less than 48.1%). Furthermore, when emphasizing the ease of pulling out the cart 1, it is considered preferable to set the groove width a of the guide rail 31 to 35 mm or less with respect to the cart 1 having a wheel width b of 27 mm (increase rate to wheel width is 29.6% or less).

That is, according to the experimental results shown in FIG. 13, it may be said that the groove width of the guide rail 31 needs to be configured so that the increase rate with respect to the wheel width is 48.1% or less. In addition, when emphasizing the ease of pulling out, it may be concluded that it is preferable to set the groove width of the guide rail 31 to 29.6% or less at the increase rate with respect to the wheel width.

According to the above experimental results, in order to move the cart 1 in the predetermined direction of movement, it is considered that the groove width of the guide rail 31 needs to be equal to or greater than 29% and equal to or less than 48% with respect to the wheel width. As in the example described above, when the wheel width is 27 mm, the guide rail 31 is arranged to form a groove having a groove width equal to or greater than 35% and equal to or less than 40 mm.

In the power transmission system according to the present embodiment, the guide rail 31Rr for guiding the wheel closest to the power transmitters is set to have the groove width A1 for maintaining a good power transmission. The guide rails other than the guide rail 31Rr have a groove width wider than the guide rail 31Rr in consideration of the mounting accuracy of each wheel in the cart. However, when the groove width is 48% or greater with respect to the wheel width, the movement of the cart 1 along the guide rails 31 may be difficult. Therefore, the guide rails other than the guide rail 31Rr have a groove width wider than that of the guide rail 31Rr in the range of 48% or less. When emphasizing the ease of movement of the cart 1, the guide rails other than the guide rail 31Rr have a groove width wider than that of the guide rail 31Rr in the range of 29% or less.

As described above, the power transmission system according to the embodiments may efficiently transmit power between the power receiver mounted on the cart stored in the storage position and the power transmitters regardless of the manufacturing error in each cart. Furthermore, the power transmission system according to the embodiments may reliably guide the cart to the storage position even when the manufacturing error in each cart is large. In addition, the power transmission system according to the embodiments may allow the user to easily perform an operation of moving the cart in the predetermined direction of movement, such as storing the cart in the storage position or pulling the cart out from the storage position.

Modifications

In the embodiment described above, each guide rail of the guide apparatus forms a groove for moving the wheel of the cart in the direction of movement (a groove for guiding the movement of the wheel). FIG. 4 illustrates an exemplary configuration in which each guide rail of the guide apparatus includes a groove formed by a pair of guide members (a pair of guide members holding both side surfaces of the wheel therebetween) to guide the movement of the wheel. Meanwhile, in the guide apparatus according to the embodiments, it is not necessary that all the guide rails are formed with the grooves for guiding the movement of the wheels. For example, the guide apparatus may be configured such that some of the guide rails guide the side of one side of the wheel.

Hereinafter, as a modification of the embodiment described above, an exemplary configuration will be described, in which one of the guide rails of the guide apparatus is configured by a guide member on one side.

FIG. 14 is a view showing a first exemplary configuration as a modification of the guide apparatus according to the embodiment.

FIG. 14 illustrates a configuration in which the guide rail 31Fr is replaced with the guide rail 31Fr' in the configuration shown in FIG. 4, as a modification. In the configuration shown in FIG. 14, the rest configuration other than the guide rail 31Fr' may be the same as the exemplary configuration shown in FIG. 4. The guide rail 31Fr' is configured by a guide member for guiding one side of the wheel 13Fr in the traveling direction of the cart 1. In the exemplary configuration shown in FIG. 14, the guide rail 31Fr' guides the right side surface of the wheel 13Fr toward the direction in which the cart 1 enters into the storage position.

Moreover, FIG. 15 is a view showing a second exemplary configuration as a modification of the guide apparatus according to the embodiment.

FIG. 15 illustrates a configuration in which the guide rail 31Fr is replaced with the guide rail 31Fr" in the configuration shown in FIG. 4, as a modification. In the configuration shown in FIG. 15, the rest configuration other than the guide rail 31Fr" may be the same as the exemplary configuration shown in FIG. 4. The guide rail 31Fr" is configured by a guide member for guiding one side of the wheel 13Fr in the traveling direction of the cart 1. In the exemplary configuration shown in FIG. 15, the guide rail 31Fr" guides the left side surface of the wheel 13Fr toward the direction in which the cart 1 intrudes into the storage position.

In the exemplary configuration shown in FIGS. 14 and 15, likewise the configuration shown in FIG. 4, the guide rail 31Rr restricts the rotating direction of the wheel 13Rr to guide the cart 1 to the storage position. The wheel 13Rr is the one that is positioned closest to the power transmitter 32 among the plurality of wheels of the cart 1 when the cart is stored in the storage position. In this example, it is assumed that the wheel 13Rr is the closest wheel to the power receiver 23 among the plurality of wheels of the cart 1.

The guide rails 31Fr' and 31Fr" are provided adjacent to the guide rail 31Rr. The guide rail 31Fr' guides the side surface of the guide rail Rr side (right side toward the storage position) of the wheel 13Fr as the second wheel to the storage position. The guide apparatus shown in FIG. 14 guides the right side surface of the wheel 13Fr with the guide rail 31Fr', while restricting, on both side surfaces of the wheels 13Rr, the rotating direction using the guide rail 31Rr.

The guide rail 31Fr" guides the side surface of the opposite side (left side toward the storage position) with respect to the guide rail Rr of the wheel 13Fr as the second wheel to the storage position. That is, the guide apparatus shown in FIGS. 14 and 15 guides the one side surface of the wheel 13Fr with the guide rail 31Fr' while restricting, on both side surfaces of the wheels 13Rr, the rotating direction using the guide rail 31Rr.

The guide rail 31Rr and the guide rails 31Fr' and Fr" guide the front wheel and the rear wheel on the right side (closer side to the power transmitter 32) of the cart 1 with respect to the direction of movement to the storage position. The right side of the cart 1 is the side on which the power transmitters 32 are installed (the side on which the power receiver 23 is installed in the cart main body 11) while the cart 1 is stored in the storage position. In the present embodiment, it is assumed that the distance between the left and right rear wheels is wider than the distance between the left and right front wheels. For this reason, when the cart 1 is stored in and pulled out from the storage position, the front wheel and the rear wheel on the right side (closer side to the power transmitter 32) of the cart 1 are moved in parallel along adjacent different movement paths from each other.

According to the configuration shown in FIGS. 14 and 15, the rear wheel 13Rr of the cart 1 located closest to the power receiver 23 may be reliably restricted in position by the groove of the guide rail 31Rr, and the front wheel 13Fr of the car 1 is restricted in movement by the guide rail 31Fr' or Fr" formed from the guide member on one side. As a result, according to the guide apparatus according to the modification, the power receiver provided in the cart 1 may be guided to be close to the power transmitter installed in the storage position, and the cart 1 may easily be stored in and pulled out from the storage position.

It should be noted that, the guide apparatus shown in FIG. 14 or FIG. 15 may be provided in the storage position at which the power transmitter 32' as shown in FIG. 5 is installed.

In addition, as another modification, the guide rail 31Fl shown in FIG. 6 may be replaced with one configured by a guide member for guiding one side of the wheel 13Fl. Further, the guide rails 31Rl shown in FIG. 6 may also be replaced with a configuration in which the guide member guides one side of the wheel 13Rl. The guide rails 31Fl and Rl shown in FIG. 6 may be configured by guide members for guiding one side of the wheel, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power transmission device, comprising:
a power transmission antenna positioned to face a power reception antenna installed on a side surface of a cart stored in a storage position;
a first rail forming a first groove that guides a first wheel, among a plurality of wheels for moving the cart, that is closest to the power transmission antenna when the cart approaches the storage position to the storage position, and that causes a distance between the power reception antenna installed on the side surface of the cart and the power transmission antenna to be within a power transmittable range;
a second rail that guides a second wheel, among the plurality of wheels for moving the cart, that is different from the first wheel to the storage position, wherein, the second rail comprises a second groove for guiding the second wheel to the storage position, and a width of the second groove is wider than a width of the first groove in accordance with a mounting accuracy of the first wheel and the second wheel to the cart; and
a wheel stopper at a leading end of the second groove formed by the second rail, the wheel stopper stopping the second wheel of the cart at the storage position.

2. The device according to claim 1, wherein the second wheel moves along a path closest to a moving path of the first wheel when the cart approaches the storage position.

3. The device according to claim 1, further comprising:
a third rail forming a third groove for guiding a movement of a third wheel different from the first wheel and the second wheel,
wherein a width of the third groove is wider than the width of the first groove in accordance with a mounting accuracy of the first wheel and the third wheel to the cart.

4. The device according to claim 3, further comprising:
a fourth rail forming a fourth groove for guiding a movement of a fourth wheel different from the first wheel, the second wheel, and third second wheel,
wherein a width of the fourth groove is wider than the width of the first groove in accordance with a mounting accuracy of the first wheel and the fourth wheel to the cart.

5. The device according to claim 1, wherein a width of the first rail is larger than a width of the first wheel and a width of the second rail larger than a width of the second wheel.

6. The device according to claim 1, wherein the power transmission antenna is configured to wirelessly transmit power to the power reception antenna.

7. A power transmission system, comprising:
a guide apparatus for guiding a cart to a storage position;
a power transmission device; and
a power reception device,
the guide apparatus comprising:
a first rail forming a first groove that guides a first wheel, among a plurality of wheels for moving the cart, that is closest to the power transmission antenna when the cart approaches the storage position to the storage position, and that causes a distance between the power reception antenna installed on the side surface of the cart and the power transmission antenna to be within a power transmittable range; and
a second rail that guides a second wheel, among the plurality of wheels for moving the cart, that is different from the first wheel to the storage position, wherein the second rail comprises a second groove for guiding the second wheel to the storage position, and a width of the second groove is wider than a width of the first groove in accordance with a mounting accuracy of the first wheel and the second wheel to the cart
the power reception device comprising:
a battery mounted on the cart;
a power reception antenna disposed on a side surface of the cart to receive power transmitted from a side in the storage position; and
a power reception circuit for supplying the power received by the power reception antenna to the battery, and
the power transmission device comprising:
a power transmission antenna disposed at a position at which a distance from the power reception antenna provided in the cart is less than a predetermined distance when the first wheel is moved along the first groove and the cart is stored in the storage position; and a power transmission circuit for causing the power transmission antenna to transmit power to cause the power reception antenna provided in the cart to receive power, wherein the power transmission device comprises a wheel stopper at a leading end of the second groove formed by the second rail, the wheel stopper stopping the second wheel of the cart at the storage position.

8. The system according to claim 7, wherein the second wheel moves along a path closest to a moving path of the first wheel when the cart approaches the storage position.

9. The system according to claim 7, further comprising:
a third rail forming a third groove for guiding a movement of a third wheel different from the first wheel and the second wheel,
wherein a width of the third groove is wider than the width of the first groove in accordance with a mounting accuracy of the first wheel and the third wheel to the cart.

10. The device according to claim 9, further comprising:
a fourth rail forming a fourth groove for guiding a movement of a fourth wheel different from the first wheel, the second wheel, and third second wheel,
wherein a width of the fourth groove is wider than the width of the first groove in accordance with a mounting accuracy of the first wheel and the fourth wheel to the cart.

11. The device according to claim 7, wherein a width of the first rail is larger than a width of the first wheel and a width of the second rail larger than a width of the second wheel.

12. The device according to claim 7, wherein the power transmission antenna is configured to wirelessly transmit power to the power reception antenna.

13. The device according to claim 7, wherein the power reception antenna is configured to wirelessly receive power from the power transmission antenna.

14. A power transmission method, comprising:
guiding a first wheel, among a plurality of wheels for moving a cart comprising a reception antenna installed on a side surface thereof, that is closest to a power transmission antenna when the cart approaches a storage position causing a distance between the power reception antenna installed on the side surface of the cart and the power transmission antenna to be within a power transmittable range, wherein the guiding the first wheel comprises guiding the first wheel by a first groove;
guiding a second wheel, among the plurality of wheels for moving the cart, that is different from the first wheel to the storage position, wherein the guiding the second wheel comprises guiding the second wheel by a second groove, and wherein the second groove has a width that is wider than a width of the first groove in accordance with a mounting accuracy of the first wheel and the second wheel to the cart; and
stopping the second wheel at the storage position by a wheel stopper at a leading end of the second groove.

15. The method according to claim 14, wherein moving the second wheel along a path closest to a moving path of the first wheel when the cart approaches the storage position.

16. The method according to claim 14, further comprising:
wirelessly transmitting from the power transmission antenna power to the power reception antenna.

17. The method according to claim 16, further comprising:
wirelessly receiving power by the power reception antenna.

18. The method according to claim 14, further comprising:
wirelessly receiving power by the power reception antenna.

* * * * *